US006965577B1

(12) United States Patent
Murphy

(10) Patent No.: US 6,965,577 B1
(45) Date of Patent: Nov. 15, 2005

(54) IDENTIFYING AN EDGE SWITCH AND PORT TO WHICH A NETWORK USER IS ATTACHED

(75) Inventor: Ciaran Murphy, Dublin (IE)

(73) Assignee: 3Com Corporation, Santa Clara, CA (US)

(*) Notice: Subject to any disclaimer, the term of this patent is extended or adjusted under 35 U.S.C. 154(b) by 841 days.

(21) Appl. No.: 09/694,673

(22) Filed: Oct. 24, 2000

(30) Foreign Application Priority Data

Jul. 15, 2000 (GB) .................................. 0017316

(51) Int. Cl.[7] ........................................... H04L 12/28
(52) U.S. Cl. ..................................... 370/255; 370/254
(58) Field of Search ........................ 370/255, 229–240, 370/254–258, 351, 389, 400; 709/200, 223–224, 709/252, 253, 400, 401, 463

(56) References Cited

U.S. PATENT DOCUMENTS 5,297,138 A * 3/1994 Black .......................... 370/254
6,003,074 A * 12/1999 Vasconcellos ............... 709/220
6,560,648 B1 * 5/2003 Dunn et al. .................. 709/224
6,681,248 B1 * 1/2004 Sears et al. .................. 709/223
2001/0033550 A1 * 10/2001 Banwell et al. .............. 370/254

FOREIGN PATENT DOCUMENTS

GB          2320396 A        6/1998
JP          9-261272         10/1997
JP          11-68789         3/1999

* cited by examiner

Primary Examiner—Huy D. Vu
Assistant Examiner—Jason Mattis
(74) Attorney, Agent, or Firm—Nixon & Vanderhye P.C.

(57) ABSTRACT

An edge switch of a packet-based communication network, the edge switch having a port to which a specified user is connected is identified. A unicast request packet is sent from a policy server to the specified user, the unicast request packet including destination address data and a selected identification code. The selected identification code is detected at the port. The packet is diverted to a management agent for the switch and an identification of the switch and the user is returned to the server.

12 Claims, 3 Drawing Sheets

IDENTIFYING AN EDGE SWITCH AND PORT TO WHICH A NETWORK USER IS ATTACHED

FIELD OF THE INVENTION

This invention relates to packet-based data communication networks and is particularly concerned with a technique for identifying the particular switch and port thereof to which a network user is directly attached, so as to be able to apply a selected control policy to that user by means of appropriate configuration or control of the port.

BACKGROUND TO THE INVENTION

In the management of local area networks and other networks which may have a multiplicity of users, it is necessary for a policy server to locate a switch, hereinafter called 'edge switch', to which a user is attached and to apply user based policy rules to that switch.

In this specification, 'switch' is intended to refer to a multi-port device which is capable of responding to address data within addressed data packets to direct those packets to a port or ports in accordance with the address data. The invention requires such a switch to be configurable so that packets passing through any particular port may be 'snooped', that is to say examined by appropriate processing circuits associated with that port to divert selected type of packets to a 'management agent' for processing. Such switches are known and are commercially available. One example is the 3Com Super Stack II switch 3300, made by 3Com Corporation of Santa Clara, Calif.

SUMMARY OF THE INVENTION

The invention is preferably implemented in practice by the sending of a special unicast request packet with a destination corresponding to the user's media access control address and network (internet protocol) address, the request packet containing an identification code, detecting the code at the switch port to which a user is connected, diverting the packet to a management agent within the switch or to means having access to the switch, and returning to a remote server an identification of the switch and the user.

Further features and developments of the invention will be apparent from the following detailed description.

DESCRIPTION OF a PREFERRED EXAMPLE

Figure 1:
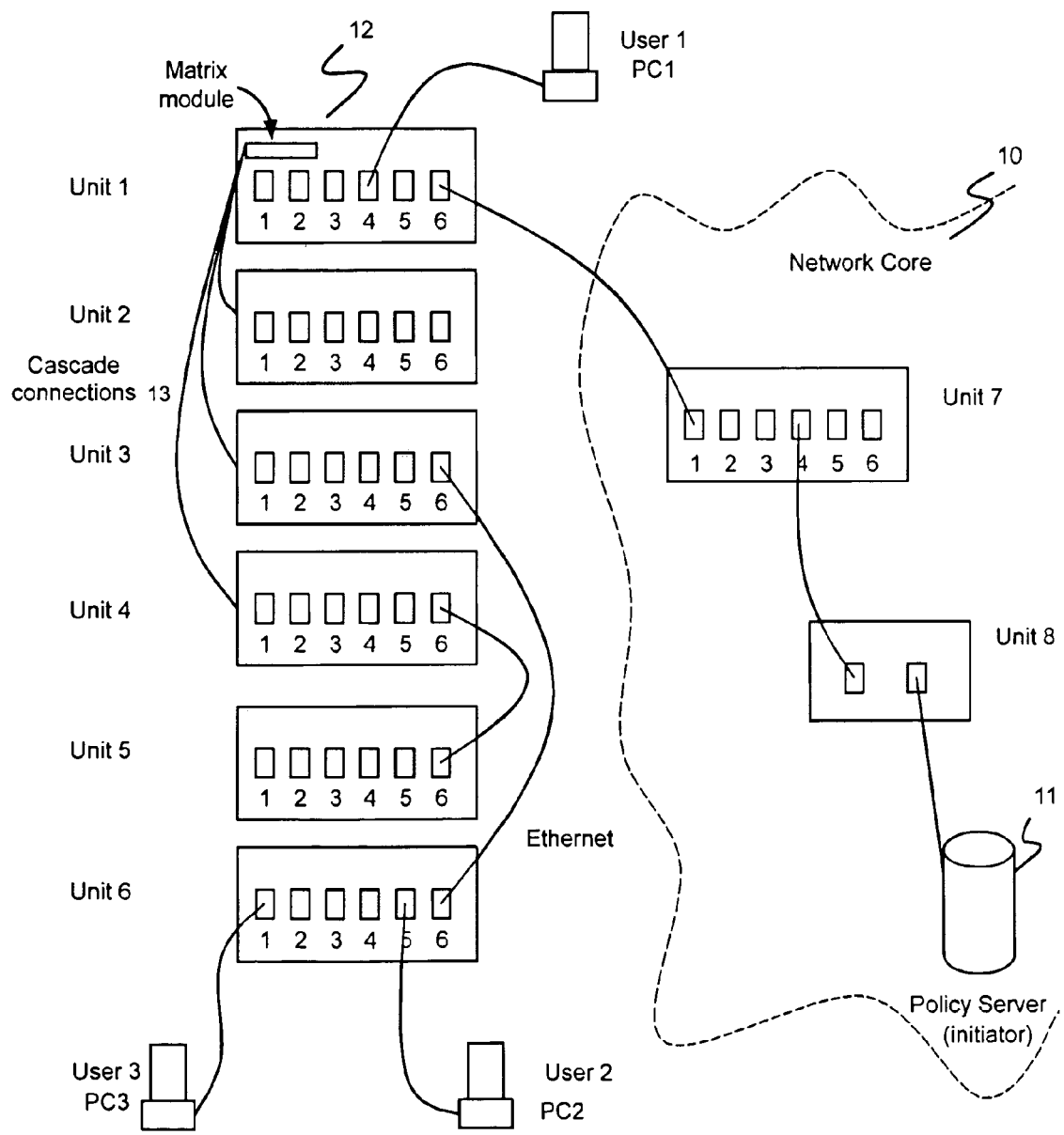
FIG. 1 is a schematic illustration of part of a packet based network in which the present invention may be employed.

FIG. 1 illustrates part of a packet based network which includes a network core 10 having a multiplicity of network units (not shown) and including a policy server 11. For the purposes of the present explanation, the policy server 11 will have a route including a Unit 8, and a Unit 7 (for example switches) to a final stack of switches 12 which include six stacked units Units 1 to 6 of which Units 1 to 4 are linked by a 'cascade' connection 13 so that they constitute, and can be managed as, a single logical entity. Port 6 of Unit 3 is connected to port 6 of Unit 6 and port 6 of Unit 4 is connected to port 6 of Unit 5. In addition to any other connections (not shown) that may exist between the units and from the units to external users, a user such as PC1 is connected to port 4 of Unit 1, user PC2 is connected to port 5 of Unit 6 and user PC3 is connected to port 1 of Unit 6. It may be presumed that, in accordance with known practice, a packet directed to the network or internet protocol address of any of the users PC1, PC2 and PC3 will reach those users by way of the above mentioned ports to which they are connected, by the ordinary process of an address resolution protocol followed by the customary packet based switching performed by the switch units on the route between policy server 11 and the particular user. Further, it is presumed that in accordance with known practice the switches are remotely configurable and in particular are so controllable to impose restrictions (policy rules) on a user connected to a particular port of a switch. These restrictions, enforced by an examination of for example header data of packets sent or received by way of that port, may determine (for example) which resources the user is allowed (or not allowed) to access, which times of the day the user may access the network, whether the user should have access to the Web, which 'quality of service' (such as priority) is applied to the user and so on. Such policy rules are specific to a user and need to be applied irrespective of the location of the user in the network.

It is convenient to apply these rules by means of a 'central' or policy server which has recourse to a database to specify the policy rules for each user. To enable the policy server to apply the rules the server must download the relevant policy information to the 'edge' switch to which the user is connected and for that purpose the switch and port which are the edge switch and port respectively for that user need to be identified.

In the present example, Port 4 of Unit 1 is an edge port for PC1, in that it is the relevant port of the switch which is closest to the user. This does not preclude the interpolation of a non-selective device (such as a repeater) between the edge port and the user.

It is assumed in the following that a policy is to be applied to the user PC 1. For this purpose it is necessary for the policy server 11 to discover the identity of the port (Port 4 of Unit 1) to which PC1 is connected. A preferred method sequence is as follows.

1. A necessary preliminary to the determination of the identity of the edge switch is the obtaining of the network (internet protocol) address of the user's end station (PC1). This may readily be obtained by means of a log-on detector in known manner. If the MAC address of the user is not initially known, then the policy server executes an ARP (address resolution protocol) for it. For this protocol to work, it is necessary (but usual) for there to be a routed connection between the policy server and a VLAN of which the user is currently a member.

2. The policy server constructs a special unicast request packet with a destination corresponding to the user's MAC and IP address. This is preferably in the general form of a 'ping' packet. Such a packet is used in a management protocol (ICMP) and is coded to elect an immediate reply in a known form. The Ping packet used in this invention has a payload which contains a special 8 byte number. It may also contain policy information, if special security precautions are added to the ping.

Figure 3:
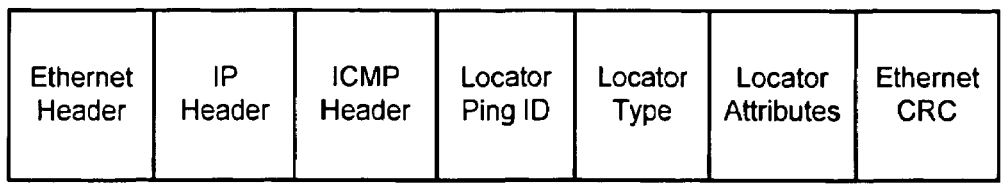
FIG. 3 illustrates an Ethernet packet which may be employed in the invention.

The form of this packet is shown in FIG. 3. The packet 30 comprises a 'Ethernet' header 31, an IP header 32, an ICMP header 33, a locator Ping ID 34, locator type fields 35, locator 'attributes' fields 36 and a conventional CRC (cyclic redundancy code) field 37.

Figure 4:
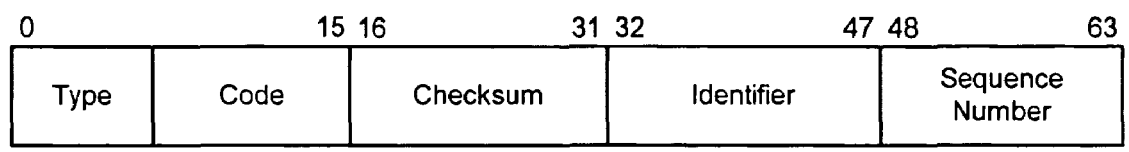
FIG. 4 illustrates a header portion of the packet illustrated in FIG. 3.

The Ethernet header and the IP header are in conventional form. The ICMP header is in standard form, shown in FIG. 4.

The fields in the ICMP Header are as follows.

The Type field indicates the ICMP message type. This is set to 8 for a 'ping' request, 0 for a 'ping' reply.

The Code field is not used. This is always set to zero.

The Checksum field covers the entire ICMP message, and preferably uses the same alogrithm as the checksum in the IP header.

The Identifier field is an identifier to aid matching of requests and replies. This field is present in all locator ping packets.

The Sequence Number field is a sequence number to aid matching of requests and replies. This field is present in all locator ping packets.

The locator Ping ID is a fixed, eight octet, pattern which is used to identify the ping as a locator ping packet. The value of this field is Ox85-92-0A-7C-D1-40-3B-F2.

There is a finite possibility that this pattern could occur in the payload of a normal ping packet. However, if it does, then the sender of the ping request would receive a ping reply with some additional information in the payload. It is not expected that this would cause any problem, in the extremely rare cases where it would occur.

The Locator Type is a single octect field which is used to indicate the type of locator ping packet. It has a value of 0x00for locator pin request packets, and 0x01for locator ping reply packets.

Figure 5:
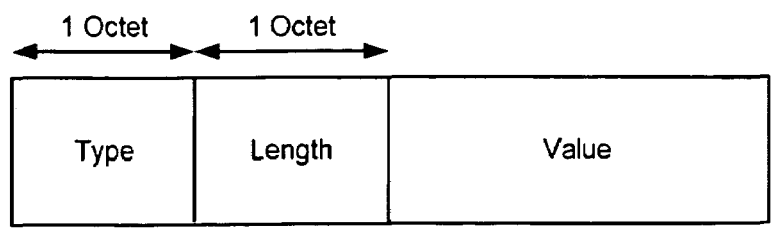
FIG. 5 is an explanatory diagram.

The remainder of the payload of the locator ping requests and locator ping replies consists of a series of attributes. The use of attributes allows the protocol to be extensible. If one end of the conversation does not recognise a particular attribute, it just ignores it. These attributes are of the type-length-value format, as shown in FIG. 5, and will be discussed later.

3. The special ping packet is forwarded using layer 2 and layer 3 forwarding and routing, towards the edge of the network, where the user is connected. Referring to FIG. 1 above, assume that the special packet has now arrived at Unit 7. Because Unit 7 is not an edge switch, it does not have ICMP snooping enabled. Therefore it just forwards the special packet on as a normal packet, to Unit 1.

4. Because Unit 1, Port 6, is not an edge port, ICMP snooping is not enabled, so the request packet is forwarded to Port 4.

5. PC1 echoes back a ping reply (keeping the ping payload unchanged—in accordance with ICMP practice.

6. Because Unit 1, Port 4, is an edge port, it has ICMP snooping enabled. Therefore, the special ping reply is diverted to the management agent in Unit 1.

7. The management agent parses the packet's payload to see if it is an unmodified special ping. In this case, the agent then further parses the packet to extract other payload information, which may contain policy information.

8. The edge switch modifies the payload of the special ping. For example, it could: change the "modifier flag" from 00 to FF; add the IP address of the switch or the stack; add the MAC address of the user; add the port number of the switch (or stack), to which the user is connected; and add the port VLAN.

9. The same ping packet that is used to locate the edge switch, may also be used to deliver policy information to it. If policy information is included in the special ping, then it is extracted and enforced by the edge switch at this stage.

10. The edge switch then lets the locator ping continue back to the initiator (policy server).

11. The policy server knows the identity of the edge switch and port number corresponding to the user. If it hasn't used the special ping mechanism to deliver policy, it can now do this via some other mechanism, such as SNMP.

Figure 2:
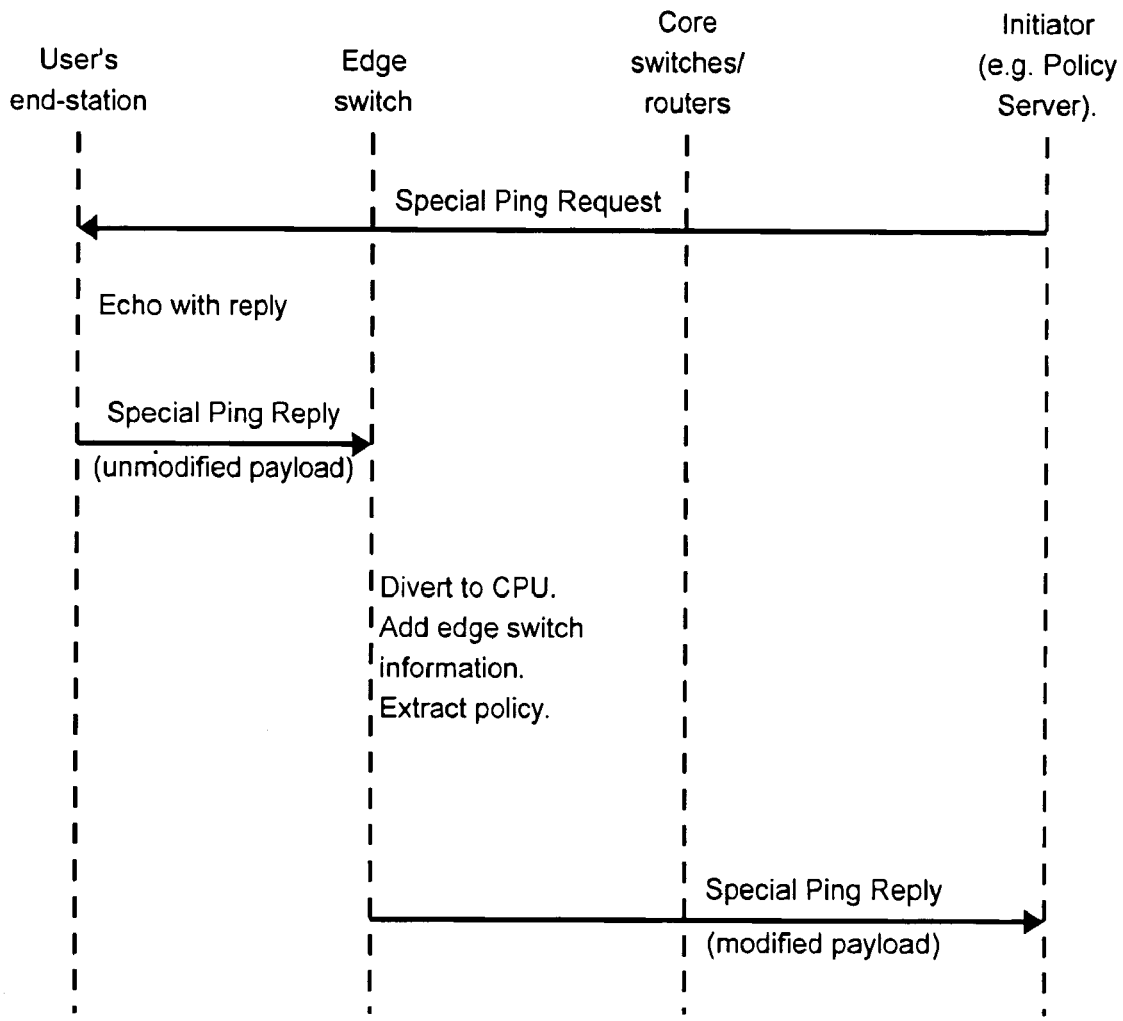
FIG. 2 is a diagram summarising the sequence of requests and replies characteristic of the present invention.

The full sequence of events is summarised in FIG. 2 above.

As described above, any packet type capable of being snooped on by the edge switch hardware, may be used for the scheme. For packet types other than ping, the edge switch would have to snoop on these before letting them go through the end-station.

This is a general solution, and may be used at any time by the policy server to locate the edge switch (e.g. not just at user login). The only condition is that the policy server knows the IP address of the user. Therefore, there is no need for the policy server to maintain a big table cross-referencing every logged in user to an edge switch. With this solution, the policy server just gets the appropriate information for a user on demand.

The various attributes are listed in Table I below.

| Type | Name | Present in Locator Ping Requests | Present in Locator Ping Replies | Compulsory |
| --- | --- | --- | --- | --- |
| 1 | Edge-Switch-IP-Address | N | Y | Y |
| 2 | Slot-And-Port | N | Y | Y |
| 3 | IF-Index | N | Y | Y |
| 4 | Bridge-Port-Number | N | Y | Y |
| 5 | User-MAC-Address | N | Y | Y |
| 6 | User-VLAN | N | Y | N |
| 7 | User-Policy-Info | N | Y | N |
| 8 | Edge-Switch-NL-Version | N | Y | Y |
| 9 | Username | Y | Y | N |

The Length field is one octet, and indicates the length of the attribute, including the Type, Length and Value fields. If an attribute with an invalid length is received, it should be ignored.

The Value field is zero or more octets and contains the information specific to a locator attribute. The format and length of the Value field is determined by the Type and Length fields.

The format of the value field is one of three data types:

String: 0–253 octets. A "string" in the Value field doesn't require an ASCII, NUL, because the attribute already has a length field.

Address: 32 bit value, most significant octet first.

Integer: 32 bit value, most significant octet first.

Each of the locator attributes are now described in more detail.

Type 1: Edge Switch-IP-Address

This attribute indicates the identifying IP address of the edge switch connected to the user to which the corresponding locator ping request was destined. This attribute is only present in locator ping replies, where it is compulsory. It has a length of 6 octets and the value contains the IP address, which is 4 octets.

Type 2: Slot-And-Port

This attribute indicates the port number on the edge switch connected to the user to which the corresponding locator ping request was destined. It is presented in "slot-and-port" format.

This attribute is only present in locator ping replies, where it is compulsory. The length is 4 octets and the value contains the port number, which is 2 octets.

Type 3: IF-Index

This attribute indicates the port number on the edge switch connected to the user to which the corresponding locator ping request was destined. It is present in "ifIndex" format. This attribute is only present in locator ping replies, where it is compulsory. The length is 4 octets and the value contains the port number, which is 2 octets.

Type 4: Bridge-Port-Number

This attribute indicates the port number on the edge switch connected to the user to which the corresponding locator ping request was destined. It is presented in "bridge-PortNumber" format. This attribute is only present in locator ping replies, where it is compulsory.

The Length is 4 octets and the value contains the port number which is 2 octets.

Type 5: User-MAC-Address

This attribute indicates the MAC address of the user's end-station. The Length is 8 octets and the value contains the MAC address, which is 6 octets.

Type 6: User-VLAN

This attribute indicates the static VLAN in which the user's edge port is disposed. The Length is 4 octets and the value contains the global VLAN ID, which is 12 bits.

Type 7: User-Policy-Info

This attribute is an octet string which contains the value of the User-Policy-Info MIB object for the user's edge port. The length is variable. The value field contains the value of the user-Policy-Info MIB object.

Type 8: Edge-Switch-NL-Version

This attribute indicates the version of Network Login supported by the edge switch to which the user is connected. The length is 3 octets and the field contains the value 0x000 for IEEE 802.1 X.

Type 9: Username

This attribute may be used by the policy server, to send the username information to the edge switch, to which the user is connected. If present in the locator ping request, this ping then remains in the subsequent locator ping reply. The length is variable and the value is and octet string containing the username.

Edge Switch Agent Requirements

Because the locator ping goes all the way to the end-station, and then comes back into the edge switch, there is no need to worry about situations where the MAC address of the end-station may have aged out, or where the end-station has moved. As long as the end-station is connected somewhere in the network, one, and only one, reply is obtained to a locator ping.

Use-Cases for Switch Agent

This section describes the behaviour of the software agent in a switch, in order to support the locator ping protocol.

Reception of Locator Ping Request on Edge Port

This use-case represents the reception of a locator ping request packet from an initiator. Because it is an edge port, the hardware is configured to snoop on ICMP packets. It therefore diverts the locator ping to the software agent.

In this case, the agent must: parse the packet, to ensure that it is locator ping request; and modify and send locator ping reply back to initiator, indicating IP address of edge switch (or stack, if the edge switch does not have one), and user port number. The IP header remains untouched. This is because the edge switch may not have an IP address of its own.

There needs to be some mechanism to examine the rate of reception of pings, to guard against a ping storm from a hostile user. This is because the management port could get overrun. If a ping storm is detected, the agent should disable ICMP snooping for some interval, e.g. 30 seconds. Because ICMP snooping is only being done for the edge ports, and not up-link ports, the chances of the switch being subjected to a ping storm are reduced.

Reception of Ping Other than Locator Ping Request on Edge Port

As the port is an edge port, ICMP snooping is enabled. Therefore, the packet gets diverted to the processor. However, the processor should just forward the packet as normal.

Reception of any Ping on Non-Edge Port

As the port is a non-edge port, ICMP snooping is disabled. Therefore, all packets are forwarded by the hardware, as normal.

Locator Ping Initiator Requirements

Locator ping requests are always transmitted by the initiator (e.g. policy server), and received by the edge switch, via the end-station echo. They are then modified, and forwarded by the edge switch, to be received by the initiator. The edge switch never initiates the conversation.

For the purpose of reliability of the transfer of information, the initiator server needs to keep track of locator ping requests and replies. This can be done using the sequence numbers in the ICMP header. If no reply has been received corresponding to a particular request for a specified period of time, then the initiator should re-send the original packet. The default value for timeout is thirty seconds. The maximum number of retries is three. If, after the maximum number of retries, the initiator has not received a locator ping reply, it should make a record of this.

What is claimed is:

1. A method of enforcing a network policy on a user connected by way of a respective edge switch to a packet-based communication network which has a network core and a plurality of edge switches, the method comprising:

(a) enabling control message snooping for each of said edge switches;

(b) obtaining the network address of said user;

(c) forwarding to said user from a policy server a unicast request packet which has the network address of said user as a destination address, includes a control message protocol header that identifies said unicast packet as a request packet and includes a payload;

(d) in response to reception of said request packet at said user, returning a reply packet which identifies said reply packet as a reply packet with an unmodified payload;

(e) at said respective edge switch, responding to said reply packet to divert said reply packet to a management agent for said respective edge switch;

(f) modifying said payload;

(h) returning to the server said reply packet including said payload as modified, said reply packet as returned to said server containing an identification of said respective edge switch and said user; and (h) providing said network policy to said respective edge switch for controlling said user.

2. A method as in claim 1 wherein said providing step (h) comprises providing policy information in said request packet and at said respective edge switch extracting said policy information from said reply packet.

3. A method as in claim 1 wherein said providing step (h) comprises delivering policy information to said respective edge switch subsequent to said returning step (g).

4. A method as in claim 1 wherein said control message snooping conforms to Internet Control Message Protocol (ICMP).

5. A method of enforcing a network policy on a user connected by way of a respective edge switch to a packet-based communication network which has a network core and a plurality of edge switches, the method comprising:

(a) enabling control message snooping for each of said edge switches;

(b) obtaining the network address of said user;

(c) forwarding to said user from a policy server a unicast request packet which has the network address of said user as a destination address, includes a control message protocol header that identifies said unicast packet as a request packet and includes a payload;

(d) in response to reception of said request packet at said user, returning a reply packet which includes said payload unmodified and includes a modifier flag which indicates that said payload is unmodified;

(e) at said respective edge switch, snooping said reply packet and diverting said reply packet to a management agent for said respective edge switch;

(f) parsing said reply packet to determine whether it has an unmodified payload;

(g) modifying said payload;

(h) returning to the policy server said reply packet including said payload as modified, an identification of said respective edge switch and said user; and (i) providing said network policy to said respective edge switch for controlling said user.

6. A method as in claim 5 wherein said providing step (i) comprises providing policy information in said payload and at said respective edge switch extracting said policy information from said reply packet.

7. A method as in claim 5 wherein said providing step (i) comprises delivering policy information to said respective edge switch subsequent to said returning step (h).

8. A method as in claim 5 wherein said control message snooping conforms to Internet Control Message Protocol (ICMP).

9. A method of enforcing a network policy on a user connected by way of a respective edge switch to a packet-based communication network which has a network core and a plurality of edge switches, the method comprising:

(a) enabling control message snooping for each of said edge switches;

(b) obtaining the network address of said user;

(c) forwarding to said user from a policy server a unicast request packet which has the network address of said user as a destination address, includes a control message protocol header that identifies said unicast packet as a request packet and includes a payload including policy information intended for the enforcement of network policy on said user;

(d) in response to reception of said request packet at said user, returning a reply packet which includes said payload unmodified;

(e) at said respective edge switch, snooping said reply packet and diverting said reply packet to a management agent for said respective edge switch;

(f) parsing said reply packet to determine whether it has an unmodified payload;

(g) extracting said policy information from said payload for use by said switch in respect of said user;

(h) modifying said payload; and (i) returning to the policy server said reply packet including said payload as modified.

10. A method as in claim 9 wherein said payload as modified includes an identification of said user and an identification of said respective edge switch.

11. A method as in claim 9 wherein said reply packet includes a modifier flag to denote whether said payload is modified or unmodified.

12. A method as in claim 11 wherein said control message snooping conforms to Internet Control Message protocol (ICMP).

* * * * *